US009706248B2

(12) United States Patent
Stuckman

(10) Patent No.: US 9,706,248 B2
(45) Date of Patent: *Jul. 11, 2017

(54) VIDEO PLAYBACK DEVICE FOR USE WITH A MOBILE COMMUNICATION DEVICE

(71) Applicant: Texas Technology Ventures, LLP, Austin, TX (US)

(72) Inventor: Bruce E. Stuckman, Austin, TX (US)

(73) Assignee: Texas Technology Ventures, LLP, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/361,739

(22) Filed: Nov. 28, 2016

(65) Prior Publication Data
US 2017/0078733 A1    Mar. 16, 2017

Related U.S. Application Data

(63) Continuation of application No. 14/135,901, filed on Dec. 20, 2013, now Pat. No. 9,538,233, which is a continuation of application No. 13/302,667, filed on Nov. 22, 2011, now abandoned, which is a continuation of application No. 10/313,970, filed on Dec. 5, 2002, now Pat. No. 8,086,093.

(51) Int. Cl.
| *H04B 1/66* | (2006.01) |
| *H04N 21/433* | (2011.01) |
| *H04N 21/41* | (2011.01) |
| *H04N 21/472* | (2011.01) |
| *H04N 21/61* | (2011.01) |
| *H04N 21/6587* | (2011.01) |
| *H04N 21/4147* | (2011.01) |
| *H04N 21/44* | (2011.01) |
| *H04N 21/482* | (2011.01) |

(52) U.S. Cl.
CPC ..... *H04N 21/4332* (2013.01); *H04N 21/4126* (2013.01); *H04N 21/4147* (2013.01); *H04N 21/44* (2013.01); *H04N 21/47202* (2013.01); *H04N 21/47217* (2013.01); *H04N 21/4828* (2013.01); *H04N 21/6175* (2013.01); *H04N 21/6587* (2013.01)

(58) Field of Classification Search
CPC ............... H04N 5/782; H04N 21/4332; H04N 21/2543; H04N 21/4335; H04N 21/4435; H04N 21/4828; H04N 21/4882; H04N 21/4126; H04N 21/47202; H04N 21/47217; H04N 21/6175; H04N 21/6587
See application file for complete search history.

(56) References Cited

U.S. PATENT DOCUMENTS

| 6,611,958 B1 * | 8/2003 | Shintani ............. H04N 5/44543 348/E5.105 |
| 9,538,233 B2 * | 1/2017 | Stuckman ............. H04N 5/782 |

(Continued)

*Primary Examiner* — Tat Chio
(74) *Attorney, Agent, or Firm* — Garlick & Markison; Bruce E. Stuckman

(57) ABSTRACT

A digital video recorder (DVR) has a memory manager to determine a particular date and a particular video program in a download schedule for which the DVR will reach a low memory condition based on the download schedule and an amount of unoccupied memory space in the DVR. The DVR outputs a display signal to indicate the particular date and the particular video program.

19 Claims, 4 Drawing Sheets

(56) References Cited

U.S. PATENT DOCUMENTS

| | | | |
|---|---|---|---|
| 2002/0108127 A1* | 8/2002 | Lew | G06F 17/30817 |
| | | | 725/142 |
| 2003/0014752 A1* | 1/2003 | Zaslavsky | H04N 21/4316 |
| | | | 725/40 |
| 2003/0120505 A1* | 6/2003 | Spiegel | G06Q 10/083 |
| | | | 705/28 |
| 2004/0010801 A1* | 1/2004 | Kim | H04N 7/17336 |
| | | | 725/86 |

* cited by examiner

US 9,706,248 B2

VIDEO PLAYBACK DEVICE FOR USE WITH A MOBILE COMMUNICATION DEVICE

CROSS-REFERENCE TO RELATED APPLICATIONS

The present U.S. Utility Patent Application claims priority pursuant to 35 U.S.C. §120, as a continuation of U.S. Utility application Ser. No. 14/135,901, entitled "VIDEO PLAYBACK DEVICE FOR USE WITH A MOBILE COMMUNICATION DEVICE", filed Dec. 20, 2013, which is a continuation of U.S. Utility patent application Ser. No. 13/302,667, filed on Nov. 22, 2011, entitled "DSL VIDEO SERVICE WITH MEMORY MANAGER," which is a continuation of U.S. Utility patent application Ser. No. 10/313,970 filed on Dec. 5, 2002, entitled "DSL VIDEO SERVICE WITH MEMORY MANAGER," issued as U.S. Pat. No. 8,086,093 on Dec. 27, 2011, all of which are hereby incorporated herein by reference in their entirety and made part of the present U.S. Utility Patent Application for all purposes.

The present application is also related to, and incorporates by reference, the following applications having the same assignee as the present application:

U.S. Utility application Ser. No. 10/313,998, entitled "DSL VIDEO SERVICE WITH AUTOMATIC PROGRAM SELECTOR", filed on Dec. 5, 2002, abandoned;

U.S. Utility application Ser. No. 10/313,930, entitled "DSL VIDEO SERVICE WITH STORAGE", filed on Dec. 5, 2002, issued as U.S. Pat. No. 7,870,593 on Jan. 11, 2011;

U.S. Utility application Ser. No. 10/313,926, entitled "SYSTEM AND METHOD FOR SEARCH, SELECTION AND DELIVERY OF MEDIA CONTENT", filed on Dec. 5, 2002, abandoned; and U.S. Utility application Ser. No. 10/313,995, entitled "SYSTEM AND METHOD FOR DELIVERING MEDIA CONTENT", filed on Dec. 5, 2002, abandoned.

BACKGROUND OF THE INVENTION

1. Field of the Invention

The present invention relates to video distribution systems.

2. Description of the Related Art

Currently, video programming is broadcast to subscribers via cable and satellite systems. Subscribers may purchase a service that uses a digital video recorder at a subscriber location in conjunction with an electronic program guide to record broadcast programs. Examples of the DVRs include those sold under the brand names of TIVO® and REPLAYTV® Users can play back recorded programs at a time that is convenient.

Digital Subscriber Line (DSL) services may allow video-on-demand services, but in many cases the bandwidth of the channel is not sufficient to transmit high quality video signals in real time.

U.S. Patent Application Publication No. 2001/0042249 discloses a system and method for transferring entertainment media files over the Internet. Show requests can occur in two ways. In one method, a user can directly request a show, such as browsing through a directory and selecting a show to request from the server. In a second method, a user can subscribe to a particular show, series of episodes, or genre of entertainment, for example. As episodes included in a subscription become available at the server-side, they are automatically delivered to the client using the client's idle bandwidth.

U.S. Patent Application Publication No. 2001/0027563 discloses a client terminal that monitors a user's viewing habits to determine favorite shows. Thereafter, if the terminal is not activated by the user to watch one of these favorites, the terminal notices the event and automatically copies the program onto disk to the extent storage space permits. Recorded programs are not deleted after viewing, however their storage space may be overwritten by other recordings. Recorded programs that have not been viewed are overwritten as needed, oldest first. Viewed programs are overwritten before non-viewed programs. A variety of more complex rules and policies is typically provided to govern which recorded programs are deleted to provide storage for new programs.

U.S. Pat. No. 6,353,444 discloses an auxiliary menu item that provides a preset for recording of a next episode in a series.

U.S. Patent Application Publication No. 2002/0040475 discloses an electronic programming guide having enhanced functionality which includes the ability to track previously selected content so that identical or similar programs can be recorded in the future. Also disclosed is a duplicate episode filter which alerts a user if a duplicate episode is being recorded. The duplicate episode filter tracks the list of recorded programs for duplicates when a record operation is initiated. If a match is determined, a notification may be visually displayed for the user.

The aforementioned publication further discloses visually alerting the viewer as a percentage of storage consumed by recorded material reaches lower levels. For an out-of-disk space alert, a user may receive a notification indicating the approximate minutes of recording time still available while recording is in progress. If the program length is greater than the amount of unused storage space available, the user may receive a notification indicating such, as well at the recording time available, prior to or at the start of the recording.

U.S. Patent Application Publication No. 2002/0038358 discloses a module designed to accommodate a request to add a single show. The module is used to add record events as specified after checking for conflicts or free disk space availability. Exemplary data that can be helpful in creating a data structure to be used by the module include an indicator to record all episodes and an indicator of the number of episodes.

U.S. Patent Application Publication 2002/0124249 discloses having advertisements downloaded to a set-top box. The advertisements are merged with content either dynamically during playback or by modification to the stored content to insert new advertisements. Time and date can be used to avoid displaying obsolete advertisements. Advertisements can be individually selected for each user based on the user's individual profile, thus making playback an individual playback for each user. In addition, advertising can be varied based upon the content, advertisement history, playback time and date. Thus, the particular advertisement associated with a video-on-demand selection is not static. Advertisement history can be used to optimize the frequency any particular advertisement is provided to a user to maintain the user's interest without the user becoming annoyed with the advertisement.

U.S. Patent Application Publication 2002/0129375 discloses having data pre-loaded onto a set-top box (STB) For example, short pre-loaded video clips such as movie trailers or advertisements may be displayed prior to showing a selected video. To increase the probability that a viewer will watch the trailers and advertisements, the pre-loaded trailer clips can be selected based on a subscriber's profile.

A set-top box database from each subscriber's set-top box is collected on a regular basis. Using this information, the list of trailers to be loaded for a given set-top box is modified to remove both already-watched trailers and trailers of videos already rented.

The set-top box includes a video file agent which determines the availability of a requested video by checking a video lookup table. The video lookup table comprises videos stored by the set-top box, videos stored at a central office, and videos stored at a video warehouse. Through a hierarchical menu display, where videos at the video warehouse are on the last set of sub-menus, a higher priority is given to menus for the videos stored by the set-top box and the central office. A higher premium could be charged for videos stored at the video warehouse to encourage subscribers to choose videos stored at the set-top box and the central office. Using the available list of trailers resident on the set-top box, the video file agent selects a mix of video trailers for viewing based on a usage profile of the subscriber and a category of video selected.

Videos transferred to a set-top box memory are divided into chapters. A subscriber can move from chapter to chapter without having to play through undesired chapters. The video chapters can be transferred in a nonlinear, weighted distribution that is more heavily buffered in the beginning video chapters.

U.S. Patent Application Publication No. 2002/0052782 discloses rewarding users for viewing advertisements and for providing information about themselves. This facilitates selection and targeting of advertisements, and allows video channel viewers to subsidize and pay for the video channel programs that they are watching and the interactive video service they are using. An incentive might comprise a rate at which the buyer entity is compensated for viewing and/or interacting with advertisements. Additionally, or alternatively, it might comprise rewards that are promised to the buyer entity for responding in certain ways to these advertisements.

U.S. Patent Application Publication No. 2002/0059584 discloses content providers (broadcasters and advertisers) using usage history information to develop various content access, billing, and compensation models for consumers and content creators/owners.

U.S. Pat. No. 6,400,996 discloses interactive television advertising models wherein a user may control the content and/or commercial information received. In some cases, certain commercial sponsors may be able to avoid deletion of their advertisement, while others may allow truncation. The acceptability of this to the consumer may depend on subsidies. Instead of paying for placements directly to the media, a portion is paid to a service provider, based on consumer viewing. The media, on the other hand, may seek to adopt a pay-per-view policy, at least with respect to the service provider, in lieu of direct advertising revenues. The service provider will account to both advertisers and content providers for use. With sufficient viewing of commercials, the entire service charge for a system might be covered for a user. On the other hand, a viewer might prefer to avoid all commercials, and not get the benefit of a subsidy. In this case, the recipient may be denied a subsidy from the commercial advertiser, and pay for the privilege of commercial free content.

The service provider performs the function of delivering optimized, substituted commercials for the general commercials provided by the commercial broadcast networks, and thus can accrue profits after paying content providers a fee. An advertiser, by selecting a particular audience, may pay less than it would otherwise pay to a broadcaster. The content providers may also charge more for the privilege of use of their works.

U.S. Patent Application Publication No. 2002/0078176 discloses downloading rented video data files in a time sensitive format that will delete the file or make it inaccessible or unviewable after the expiration of a specific rental period and/or after a specified number of viewings. Purchased and/or rented video data files are downloaded in a copy protected format to prevent unauthorized reproduction or resale of the video data files by the customer.

U.S. Patent Application Publication No. 2002/0129371 discloses use of content management information having an access time threshold value and charging information. The access time threshold value is a time from a point at which a client receives content-related information until a point at which the client actually requests content distribution. For some content, the longer the access time, the lower is the charge, i.e. slow access enables the user to receive a discount. Reducing the charge as access time increases can be used as a charging method for media of highly real-time character, such as news, and media that have greater value the more recent they are such as movies.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF EXEMPLARY EMBODIMENTS

Disclosed herein are embodiments of a digital video recorder (DVR) and an accompanying DSL video distribution service. The DSL service provides video content to the DVR in either a real-time transmission mode or a non-real-time transmission mode. The DVR promotes viewing of video programs at any time after being received by the DVR, in contrast to viewing a video program during its broadcast time. The DVR and service facilitate video services for DSL without the need for real-time speed.

Figure 1:
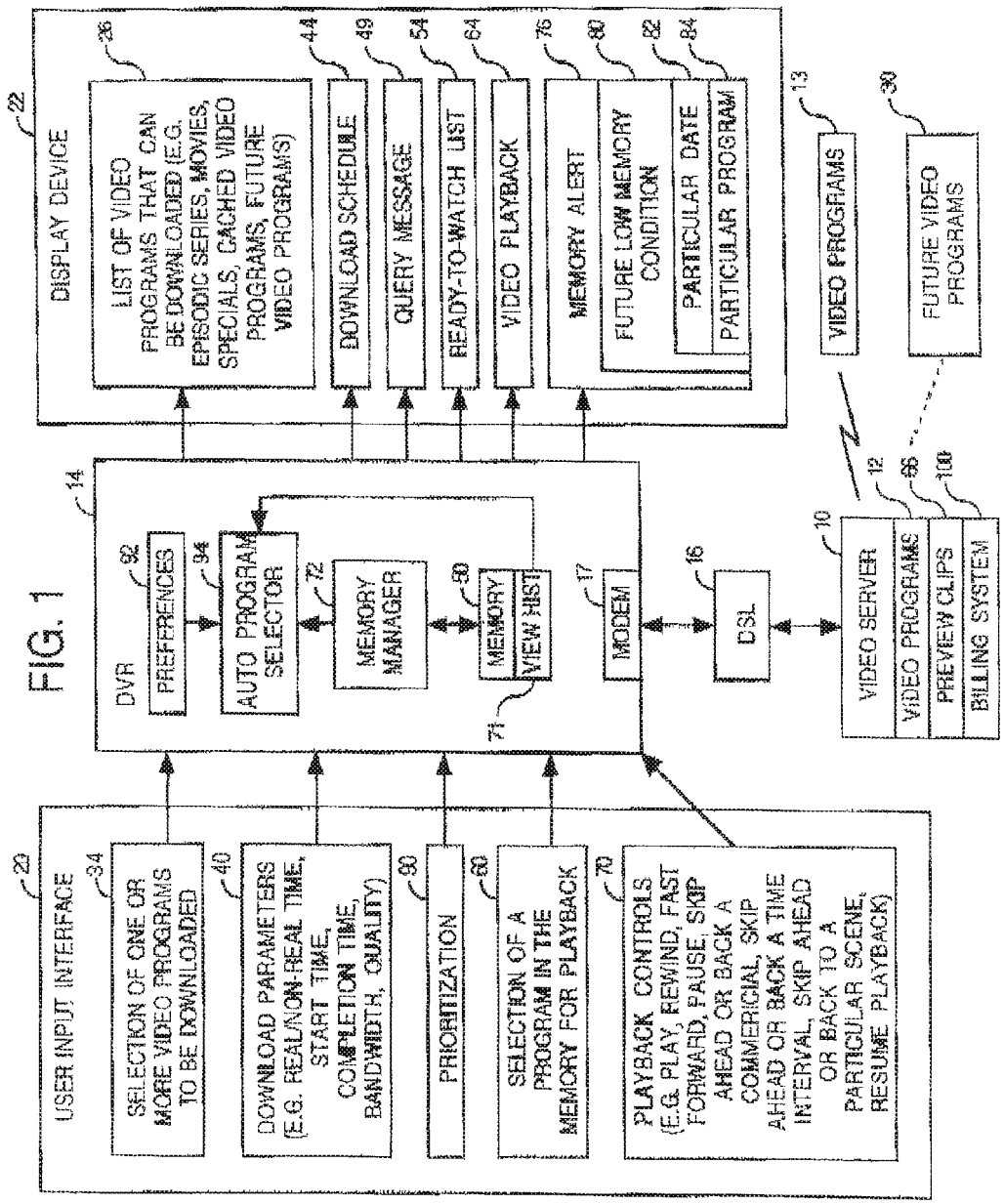
FIG. 1 is a block diagram of an embodiment of a system to provide a DSL video service with storage.

Embodiments of the present invention are described with reference to FIG. 1, which is a block diagram of an embodiment of a system to provide a DSL video service with storage, and FIG. 2 which is a flow chart of an embodiment of a method of providing the DSL video service with storage. As shown in FIG. 1, the system comprises a video server 10 having locally-stored video programs 12 and remotely-stored video programs 13 available for downloading by multiple customers. The video server 10 may be located either at a central office of a telecommunication system that provides the DSL service or at an alternative location.

Each customer has a digital video recorder (DVR) 14 which communicates with The video server 10, via DSL 16 or an alternative telecommunication network, to request, receive and store selected ones of the video programs 12 and 13. The digital video recorder 14 may be embodied by either a so-called "set-top box" or a general purpose computer. Regardless of its form, the digital video recorder 14 has a network interface, a mass storage device, a processor, and video recording hardware and/or software stored on a computer-readable medium.

The digital video recorder 14 comprises a DSL modem 17 or an alternative network interface to communicate with the video server 10 according to a DSL protocol or an alternative protocol. The DSL protocol may be based on at least one of Data Over Cable Service Interface Specifications (DOCSIS), Asymmetric Digital Subscriber Line (ADSL), Very-high-data-rate Digital Subscriber Line (VDSL), Symmetrical Digital Subscriber Line (SDSL), and Multirate DSL (MDSL).

Selections of video programs are made using a user input interface 20. Examples of the user input interface 20 include, but are not limited to, any combination of a remote control, a keyboard, a pointing device, and a voice/speech input and recognition device.

Playback of received video programs is initiated and controlled by the user input interface 20. The digital video recorder 14 outputs a signal to display video programs on a display device 22. Examples of the display device 22 include, but are not limited to, a television and a monitor, either of which may display video using a cathode-ray tube, a liquid crystal display or plasma technology.

Figure 2:
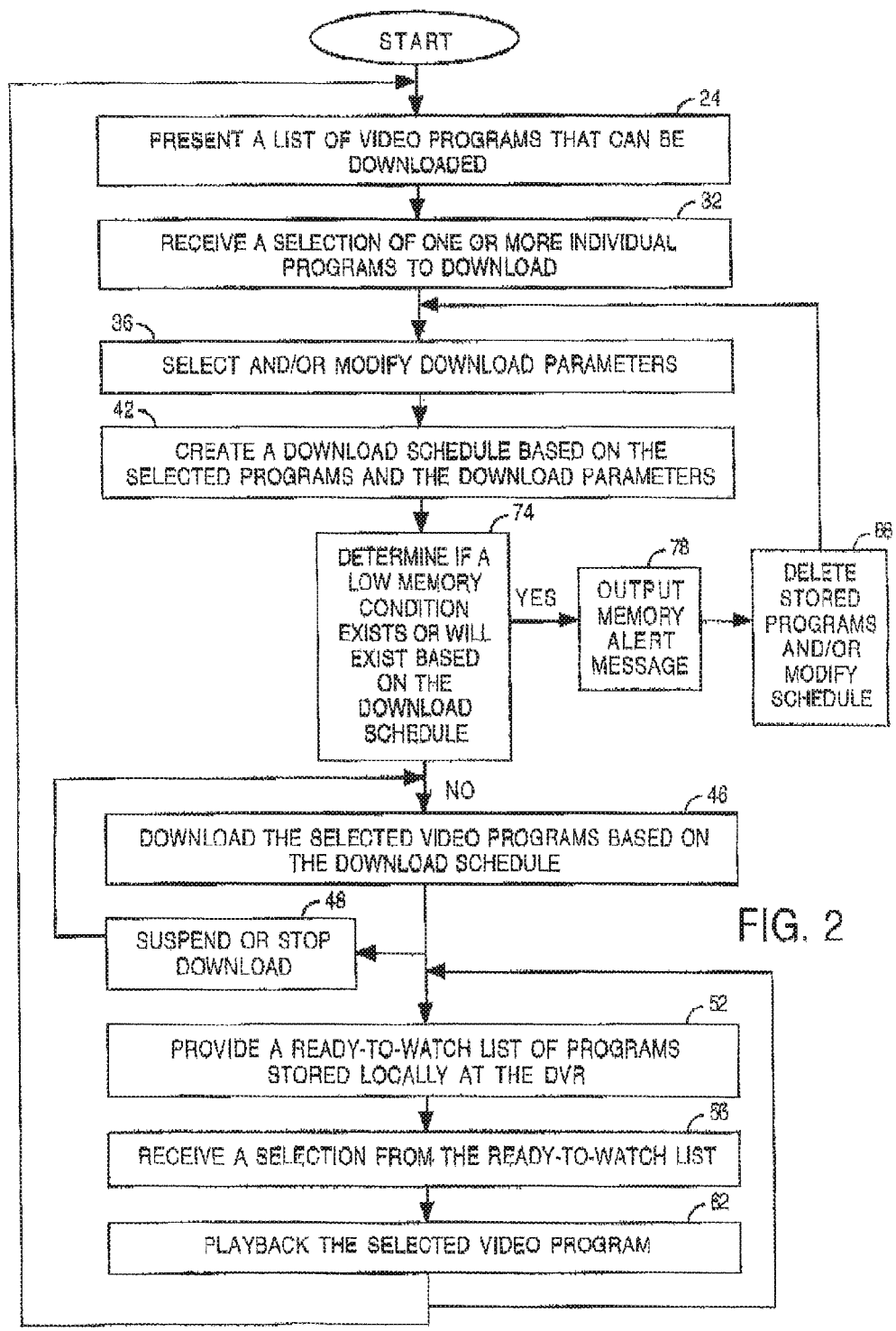
FIG. 2 is a flow chart of an embodiment of a method to provide the DSL video service with storage.

As indicated by block 24 in FIG. 2, a method of providing the service comprises presenting a list of video programs 26 that can be downloaded. The list of video programs 26 is communicated from the video server 10 to the digital video recorder 14 via the DSL 16, and displayed by the display device 22. The list of video programs 26 can include one or more episodic series such as "ER", one or more movies such as "DIE HARD", and one or more specials such as "The 25th Anniversary Barney Special". The list of video programs 26 identifies the video programs 12 cached at the video server 10, the video programs 13 accessible by the service but stored elsewhere, and video programs 30 which are not yet available but will be made available in the future. Examples of video programs 30 appearing in the list 26 before being available include future episodes of a series such as "ER" and a future movie release such as "ROCKY XII". Video programs 30 which are not yet available include an associated date of download availability in the list 26.

As indicated by block 32, the method comprises receiving a selection 34 of one or more individual programs that the user wants to download. The selection 34 is made using the user input interface 20 based on the list 26, and received by the digital video recorder 14.

As indicated by block 36, the user may select and/or modify parameters 40 which affect the download of the selected programs. The selection and/or modification of the parameters 40 is made by the user using the user input interface 20, and received by the digital video recorder 14. Examples of the parameters include, but are not limited to, a start time, a completion time, bandwidth, quality, and real/non-real time.

The start time specifies either when the download process is to or when the customer may begin to view a program. Examples of a download-related start time parameter include start downloading now, start downloading tonight, start downloading tomorrow, start downloading next week, start downloading when the video becomes available, and start downloading in a specified amount of time (e.g. start downloading in 2 hours). Examples of a customer-viewing start time parameter include make viewable at a particular time (e.g. 8:00 this evening), make viewable tonight, make viewable tomorrow, make viewable next week, and make viewable in a specified amount of time (e.g. make viewable in 2 hours). Based on the customer-viewing start time parameter, a download-related start time is determined. Here, the download-related start time may be calculated in software to ensure that the customer may begin viewing the program at the customer-viewing start time. For example, if the customer wishes to begin viewing a video at 8:00 this evening, the software would calculate when to begin the downloading the video so that enough is received/buffered by 8:00.

The completion time specifies when the download process is to end. In light of a minimum amount of time required to perform the download, the user may not be free to specify any desired completion time. Examples of the completion time parameter include complete downloading tonight, complete downloading "tomorrow, complete downloading next week, and complete downloading in a specified amount of time (e.g. complete downloading in 2 hours).

The bandwidth parameter specifies an amount of bandwidth to dedicate to the download process. Examples of the bandwidth parameter include use all bandwidth, use a specified fraction of available bandwidth, use a specified absolute amount of bandwidth, save a specified amount of bandwidth (e.g. 64 kbps) for other purposes, and use a qualitative amount of bandwidth (e.g. low, medium or high)

The quality parameter specifies viewing quality for the video p rams. For lower values of the quality parameter, the video programs are compressed more to reduce the download time. Examples of the quality parameter include low, medium and high. Other examples of the quality parameter include a video cassette recorder (VCR) quality and a DVD 5.1 quality. Pricing for the video programs may be based on the quality parameter, where a customer pays more for a higher quality.

The real/non-real time parameter specifies whether the download is for substantially real-time viewing (e.g. streaming of content), or for non-real-time viewing. The user may be charged a premium to receive a substantially real-time download in contrast to a non-real-time download. Substantially real-time downloading is considered to include cases where buffering is performed by the digital video recorder 14. For real-time viewing, this disclosure also contemplates that some content in the list of video programs 26 may not be intended to be stored by the digital video recorder 14 for later viewing.

As indicated by block 42, the method comprises creating a download schedule 44 based on which programs were selected 34 and the download parameters 40. The download schedule 44 lists the various selected programs, their download parameters such as start time or completion time, and indicates progress of any in-progress downloads. The download schedule 44 is displayed by the display device 22 to allow the user to edit the download schedule 44, change download parameters 40, discontinue one or more downloads, or perform other download schedule modification acts using the user input interface 20.

As indicated by block 46, the method comprises downloading the selected video programs on either a real-time or a non-real-time basis to the user's digital video recorder 14. The selected video programs are downloaded from the video server 10 via the DSL 16. The digital video recorder 14 stores the downloaded video programs as digital data in a memory 50. Examples of the memory 50 include, but are not limited to, a magnetic storage medium such as a hard disk, an electronic storage medium such as a flash memory, and optical storage medium such as an optical disk. Regardless of its form, the memory 50 is readable, writeable, and re-writeable.

For real-time downloads, the digital video recorder 14 outputs a signal to display the video program using the display device 22 while the download is in progress.

Optionally, as indicated by block 48, the download of added programs may be stopped or suspended if, during the download, some bandwidth of the DSL 16 is being used for another application. For example, a personal computer may use some bandwidth when browsing the Internet using the DSL 16. The digital video recorder 14 may output a message 49, for display by the display device 22, to query the user if the download should be terminated or suspended. An example of the message 49 is "I am recording Leave it to Beaver, do you want to suspend or terminate this download?". The digital video recorder 14 either continues, suspends, or terminates the download based on a response from the user received by the user input interface 20.

As indicated by block 52, the method comprises providing a ready-to-watch list 54 of all programs that are currently stored locally in the memory 50 of the digital video recorder 14. The digital video recorder 14 outputs the ready-to-watch list 54 for display by the display device 22. In one embodiment, the digital video recorder 14 determines if a sufficient amount of an in-progress download has been received to allow playback of a video program before completing the download. If a sufficient amount of the video program has been downloaded to permit playback, the video program is included in the ready-to-watch list 54 but indicated to show that the download is still in progress. Otherwise, the digital video recorder 14 may add the video program to the ready-to-Watch list 54 after the download is complete.

As indicated by block 56, the method comprises receiving a selection 60 of a video program from the ready-to-watch list 54. The selection 60 is made by the user using the user input interface 20, and received by the digital video recorder 14. In response thereto, the digital video recorder 14 performs an act of playing back the selected video program, as indicated by block 62, for display by the display device 22. The resulting video playback is represented by reference numeral 64.

In one embodiment, the video programs that are downloaded include trailers or commercials for other programs. The trailers are played for display by the display device 22 before, during, and/or after playback of the video program. The user can easily select a program advertised by a trailer by pressing, for instance, a single button of the user input interface 20 which initiates a "download this" function. In response to the user-selection, flow of the method is directed back to block 36 wherein the user is prompted to select and/or modify download options, or use a set of default options to affect downloading of the advertised program. The advertised program is added to the download schedule (block 42), and is downloaded based on the schedule (block 46). If playback of a video program was interrupted by the user selection of the trailer, playback of the video program is resumed either before or during downloading of the advertised program.

Similarly, preview clips 66 can be downloaded automatically from the video server 10. The preview clips 66 may be substantially only commercials for other shows to download. In one embodiment, the preview clips 66 are launched and played automatically in a split screen mode while the user accesses administrative functions of the digital video recorder 14. The user can order a show based on one of the preview clips 66 in the manner described for the trailers.

The user input interface, 20 provides playback controls 70 which allow the user to play, pause, rewind, fast forward and otherwise control the video playback 64. Examples of advanced playback features provided by the playback controls 70 include, but are not limited to, different playback speeds, different rewind speeds, different fast forward speeds, an ability to skip ahead or back one commercial, an ability to skip ahead or back a time interval such as X seconds, and scene navigation such as an ability to skip or start at a particular scene such as scene Y.

Either the video service or a program producer may divide a broadcast program into scenes to allow viewers to employ scene navigation to watch selected scenes of interest. If a viewer is not interested in a subject matter of a particular scene, he/she can skip to the next scene, for example. This feature is beneficial to users watching broadcast programs such as news programs having multiple news reports, and talk shows having multiple topics.

Scene navigation may be implemented based on the teachings of U.S. Pat. Nos. 5,933,841 and 6,442,574, which are hereby incorporated by reference into the present disclosure. User-selectable scene headings may be juxtaposed with the video playback 64 on the display device 22. Users can select any of the scene headings using the user input interface 20 to jump the video playback 64 to a desired portion of the video program.

The playback controls 70 may include a resume feature to allow a user to resume viewing the video playback 64 at a point that the user left off. In the case of playback of an in-progress download, use of the fast forward and skip ahead features may be limited.

Based on the playback, the digital video recorder 14 updates a viewing history 71 of the video program. For each of the video programs, the viewing history 71 provides a time and date stamp indicating when the video program was watched using the digital video recorder 14. Also for each of the video programs, the viewing history 71 indicates which users watched the video program using the digital video recorder 14. Further, the viewing history 71 may include episode information for at least one of the video programs. Examples of the episode information include, but are not limited to, a unique episode identification number or code, and a date that the particular episode was initially broadcast. The ready-to-watch list 54 may indicate the viewing history 71 of each video program so that users can easily determine if and when they have watched each video program, who else has watched each video program, and optional episode information for the video program.

The digital video recorder 14 comprises a memory manager 72 that manages the storage of video programs in the memory 50. Some video programs are permitted to be stored indefinitely in the memory 50, while other video programs may have associated persistence conditions. An example of a persistence condition is that only a limited number (e.g. one or two) of playbacks of a video program is permitted. Another example of a persistence condition is that a video program may be stored in the memory 50 only for a limited time period (e.g. one week or two weeks). Based on its persistence conditions and its viewing history 71, a video program may be automatically deleted from the memory 50 by the memory manager 72.

The memory manager 72 is responsive to the user input interface 20 to enable the user to select and manually delete one or more of the video programs stored in the memory 50. In one embodiment, the memory manager 72 attempts to keep the memory 50 as full as possible in order to maximize the amount of programming that the user has to watch. In this embodiment, the memory manager 72 retains the video programs in the memory 50 until unoccupied space in the memory 50 reaches an undesirably low level.

As indicated by block 74 in FIG. 2, the memory manager 72 serves to determine if a low memory condition either presently exists or will exist based on the download schedule. If either a present or future low memory condition is determined, a memory alert message 76 is outputted (block 78) by the digital video recorder 14 for display by the display device 22. For a future low memory condition 80, a particular date 82 for which the digital video recorder 14 will reach a low memory condition based on the download schedule, an amount of unoccupied memory space in the digital video recorder 14, and optionally persistence conditions of one or more video programs stored in the memory, is determined and included in the memory alert message 76. The particular date may be a present date (i.e. on the same day that the memory alert message 76 is outputted), a day later the present date, or at least two days later than the present date. Further, a particular program 84 in the download schedule for which the digital video recorder 14 will reach the low memory condition is determined and included in the memory alert message 76.

In this way, the digital video recorder 14 warns the user either when the memory 50 is running low or if the memory 50 will be running low based on the download schedule. In response to the memory alert message 76, the user may manually delete one or more of the video programs stored in the memory 50 and/or modify the download schedule using the user input interface 20 (block 88).

In one embodiment, the memory manager 72 automatically deletes one or more video programs (e.g. those which may otherwise persist indefinitely) in the memory 50 to make room for new downloads. The memory manager 72 selects video programs for deletion based on a priority level associated with each video program. The priority of a video program added to the memory 50 is automatically set to a low value so that it will be an early candidate for deletion if the memory 50 becomes low. Upon seeing the added video program on the download schedule 44 or the ready-to-watch list 54, the user can Change the priority level to save the video program longer, if desired. More generally, the user can set a prioritization 90 of any of the video programs in the download schedule 44 or the ready-to-watch list 54 using the user input interface 20. The prioritization 90 is communicated from the user input interface 20 to the digital video recorder 14 for use by the memory manager 72.

To illustrate operation of the memory manager 72, consider a hypothetical state of the digital video recorder 14 on a present date of May 13th. On the present date, the digital video recorder 14 has 2 Gigabytes of unoccupied memory space. The digital video recorder 14 has multiple video programs stored in the memory 50, consisting of video program VP1 (occupying 2 Gigabytes) having a persistence condition that will cause its automatic deletion at the end of the day of May 14th, video program VP2 (occupying 2 Gigabytes) which may persist indefinitely but has a low priority, and video programs VP3 to VPN (occupying 94 Gigabytes) which may not be automatically deleted. The download schedule comprises recording a first video program (1 Gigabyte) on May 14th, a second video program (4 Gigabytes) on May 15th, and an episode of "Scooby Doo" (2 Gigabytes) on May 16. Using this information, the memory manager 72 determines that there is sufficient memory space (2 Gigabytes) to record the first video program on May 14th (which will result in 1 Gigabyte being unoccupied), to automatically delete the video program VP1 at the end of May 14th (which will result in 3 Gigabytes being unoccupied), to automatically delete the low priority video program VP2 on May 15th (which will result in 5 Gigabytes being unoccupied) before recording the second video program (which will result in 1 Gigabyte being unoccupied). However, the memory manager determines that a future low memory condition will occur when recording "Scooby Doo" on May 16th (since this program is 2 Gigabytes and only 1 Gigabyte will be unoccupied with no video programs in the memory 50 qualifying for automatically deletion). The digital video recorder 14 informs the user that "you will run out of memory on May 16th when I download Scooby Doo" in the memory alert message 76.

Optionally, the video distribution service may manage titles purchased for indefinite use. The video distribution service may allow the customer to recover content he/she had deleted from the digital video recorder 14 but had indefinite license rights to.

The digital video recorder 14 may have preference data 92 stored for each of its users. In one mode, the digital video recorder 14 learns the preferences of a user by prompting the user to enter preference information and/or by observing viewing habits of the user using the viewing history 71. When a sufficient amount of bandwidth of the DSL 16 and unoccupied space in the memory 50 exist, an automatic program selector 94 automatically adds programs to the download schedule 44 based on the preference data 92 and the viewing history 71.

If a user likes a particular genre, the automatic program selector 94 may automatically add other programs of the particular genre. If a user likes a particular episodic series, the automatic program selector 94 may automatically add episodes of the series. For example, consider a user who has been downloading old Star Trek episodes. The automatic program selector 94 may automatically add more Star Trek episodes to the download schedule 44.

Based on the viewing history 71, the automatic program selector 94 may automatically add programs to the download schedule 44 to attempt to have at least a particular number of unwatched episodes of a series, or a particular number of subsequent episodes of a series, or a particular number of unwatched programs of a particular genre, stored in the memory 50. By unwatched, it is meant that the episode or program has not been recently downloaded and watched using the digital video recorder 14. In some embodiments, the particular number may be two or three. Thus, for an episodic series, the automatic program selector 94 may have a goal of maintaining the next two or three episodes of a user's favorite series in the memory 50.

For example, consider the memory 50 having stored therein episode numbers 199, 200 and 201 of "Leave it to Beaver". In response to the user playing back episodes 199 and 200 on an evening, the automatic program selector 94 may add episodes 202 and 203 to the download schedule 44 for downloading within about 24 hours. Thus, by next evening, the memory 50 will have stored therein episode numbers 201, 202 and 203. This promotes viewing of episodes in order and without having to wait for a user-initiated download request. A more general description of this feature will be provided with reference to FIG. 4.

Optionally, the service itself may select items of interest to the user and download them to the digital video recorder 14 independent of the preferences 92.

The video service has an associated billing system 100 to bill subscribers, content providers and advertisers. The billing system 100 charges subscribers for downloading video programs. The price charged to a subscriber for downloading a video program may be based on a level of service reflected by its download parameters 40. The billing system 100 may charge a premium for a real-time on demand download in contrast to a non-real-time download. For non-real-time downloads, the billing system 100 may charge more for earlier start and/or completion times. For example, the billing system 100 may charge a price P1 for a real-time download, a price P2 for a download within two hours, a price P3 for an overnight download, and a price P4 for a download within a week, where P1>P2>P3>P4.

Further, the price charged to a subscriber for downloading a video program may be based on the storage location of the video program. The locally-stored video programs 12 may be discounted relative to the remotely-stored video programs 13.

The billing system 100 may charge advertisers if the video service provides advertising to the digital video recorder 14. Advertisements may be downloaded to the digital video recorder 14 for display either before, during, or after playback of video programs. Each of the advertisements may have an expiration date which initiates its automatic deletion from the digital video recorder 14. The digital video recorder 14 may maintain an advertisement viewing history. The advertisement viewing history tracks when each advertisement was viewed and by whom. The advertisement viewing history can be used to ensure that advertisements are not being inserted with an undesirably high frequency. Some advertisements may be inserted based on the preference data 92 while others are pushed regardless of the preference data 92. Different advertisements may be displayed for different playbacks of the same video program at different times. Also, advertisements may be geographically targeted. For example, a customer located in Austin, Tex. who has expressed an interest in purchasing a car may be receive at his/her DVR one or more car advertisements from auto dealers in the Austin area, but no advertisements from auto dealers in Chicago.

The billing system 100 may charge sponsors of video programs that the service itself pushes to users regardless of user preferences or selections.

The digital video recorder 14 may have a feature that selectively permits and prohibits transferring stored video programs to another medium. The other medium may be a video cassette or a digital video disk (DVD), for example. Some video programs may prohibit transfer to another medium, in which case the digital video recorder 14 complies.

Figure 3:
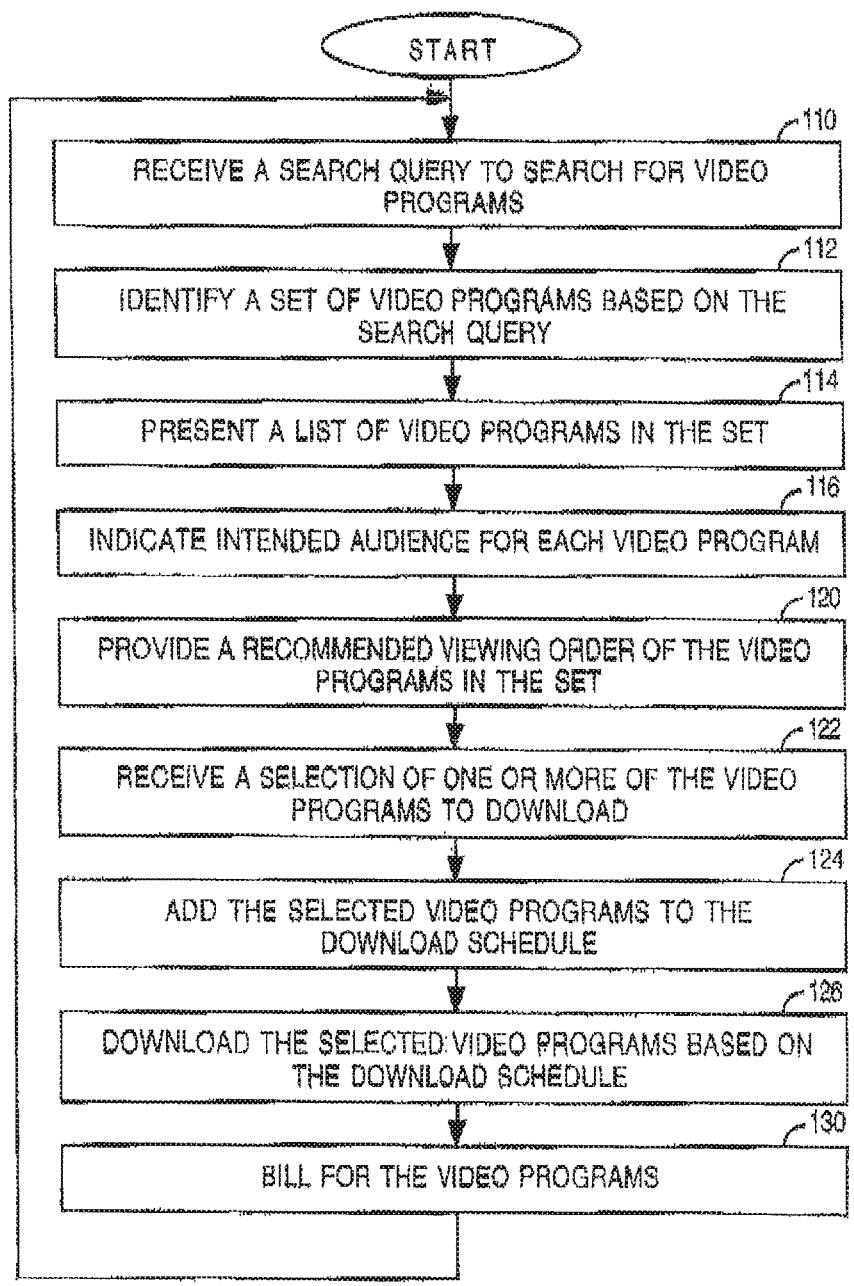
FIG. 3 is a flow chart of an embodiment of a method of ordering multiple video programs from a video server.

FIG. 3 is a flow chart of an embodiment of a method of ordering multiple video programs from the video server 10. The acts performed in this embodiment are performed in association with acts and features described with reference to FIGS. 1 and 2.

As indicated by block 110, the method comprises receiving a search query to search for video programs. The search query is entered and/or selected by the user using the user input interface 20. The search query is communicated from the user input interface 20 to the digital video recorder 14. The digital video recorder 14 communicates the search query to the video server 10 via the DSL 16.

As indicated by block 112, the method comprises identifying a set of video programs based on the search query. For example, suppose the user was interested in video programs about insects. The user would enter and/or select "insects" as the search query. The video server 10 or another network element would identify a set of video programs that pertain to insects.

The set of video programs may include at least one of the locally-stored video programs 12, at least one of the remotely-stored video programs 13, and at least one of the future video programs 30.

As indicated by block 114, the method comprises providing, to the user, a list of the video programs in the set. The list is communicated from the video server 10 to the digital video recorder 14 via the DSL 16. The list is displayed by the display device 22.

As indicated by block 116, the method optionally comprises indicating in the list that at least one video program in the set is for a first intended audience, and at least one other video program in the set is for a second intended-audience. The first intended audience may be kids and the second intended audience may be adults. Continuing with the above example, suppose that the set of video programs about insects consists of a show that was broadcast on the Discovery Kids Channel, a show that was broadcast on Animal Planet, a show that was broadcast on the National Geographic Channel, an episode of Nova that was broadcast on PBS. The Discovery Kids' show may be indicated to be intended for kids, and the Animal Planet show, the National Geographic show and the episode of Nova may be indicated to be intended for adults.

As indicated by block 120, the method optionally comprises providing a recommended viewing order of the video programs in the set. The recommended viewing order may indicate an interrelationship between video programs in the set. For example, the recommended viewing order may be of increasing depth or sophistication in the subject matter indicated by the search query, or a chronological order based on production dates of the video programs. Continuing with the above example, the recommended viewing order may be: (i) the Discovery Kids' show, (ii) the Animal Planet show, (iii) the episode of Nova, and (iv) the National Geographic show.

As indicated by block 122, the method comprises receiving a selection of one or more of the video programs in the set. The selection is made by the user using the user input interface 20. The selection is communicated from the user input interface 20 to the digital video recorder 14. The digital video recorder 14 communicates the selection to the video server 10 via the DSL 16. Continuing with the above example, consider the user selecting all four of the shows in the list.

As indicated by block 124, the method comprises adding the selected video programs to the download schedule 44 described with reference to FIGS. 1 and 2. The selected video programs are scheduled in accordance with the recommended viewing order.

As indicated by block 126, the method comprises downloading the selected video programs based on the download schedule. The download is performed as described with reference to FIGS. 1 and 2. The user may view all or part of each of the selected video programs using the digital video recorder 14 and the display device 22. The user may navigate within each video program using the user input interface 20. Further, the user may navigate from one video program to another video program using the user input interface 20 based on the teachings in U.S. Pat. No. 6,145, 000, which is hereby incorporated by reference into the present disclosure.

As indicated by block 130, the method comprises billing the user for downloading the selected video programs. The user may be given a discount if all videos in the set are ordered. Further, the user may be billed based on how much of the video programs are viewed using the digital video recorder 14. Continuing with the above example, suppose an adult user, after watching three minutes of the Discovery Kids' show, would prefer to stop watching the show and move on to the more sophisticated Animal Planet show (which is the next program in the recommended viewing order). The user may be billed for the Discovery Kids' show commensurate with three minutes of viewing time in contrast to viewing the entire show.

Figure 4:
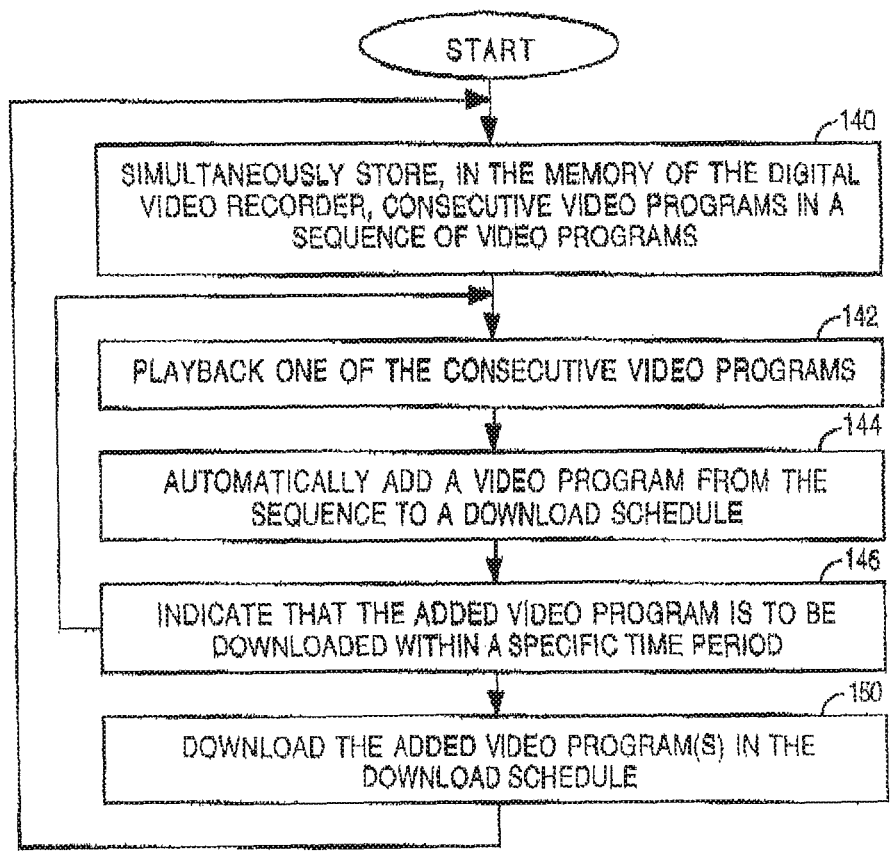
FIG. 4 is a flow chart of an embodiment of a method of automatically adding video programs to a download schedule.

FIG. 4 is a flow chart of an embodiment of a method of automatically adding video programs to a download schedule. As indicated by block 140, the method comprises simultaneously storing, in the memory 50 of the digital video recorder 14, consecutive video programs in a sequence of video programs. The sequence of video programs may comprise a sequence of episodes in an episodic series, a sequence of video programs of a particular genre, or a recommended viewing order of video programs based on a search query as described with reference to FIG. 3. The consecutive video programs are downloaded from the video server 10 to the modem 17 of the digital video recorder 14. In one embodiment, at least three consecutive video programs in the sequence are simultaneously stored in the memory 50. However, any number of consecutive video programs in the sequence may be simultaneously stored.

As indicated by block 142, the method comprises playing back one of the consecutive video programs using the digital video recorder 14. The video program is played back for display by the display device 22. Initially, the first of the consecutive video programs is played back.

As indicated by block 144, the method comprises automatically adding a video program from the sequence to the download schedule 44 in response to said playing back the one of the consecutive video programs. The added video program is automatically added by the automatic program selector 94. Initially, the added video program is one which sequentially follows a last of the consecutive video programs stored in the memory 50.

As indicated by block 146, the method optionally comprises indicating in the download schedule 44 that the added video program is to be downloaded from the video server 10 within a specific time period, such as about a day.

The acts indicated by blocks 142, 144 and 146 may be repeated for each of the consecutive video programs stored in the memory 50. For example, a second of the consecutive video programs may be played back. In response thereto, the automatic program selector 92 automatically adds another video program from the sequence to the download schedule 44. The other added video program consecutively follows the previously-added video program in the sequence.

As indicated by block 150, the method comprises downloading the one or more added video programs in the download schedule 44. The one or more added video programs are downloaded from the video server 10 to the digital video recorder 14, and stored by the memory 50. As a result, a new set of consecutive video programs is stored by the memory 50. The new set of consecutive video programs may or may not include any of the previous set of consecutive video programs.

Flow of the method is directed back to block 142, wherein a user can play back the next unwatched video program in the sequence using the digital video recorder 14. This method promotes viewing of video programs in order and without having to wait for a user-initiated download request.

The video server 10 or another network element may allow the selection of video programs to be made via a wide area computer network such as the Internet or World Wide Web. Using a computer in communication with the wide area computer network, the customer may select video programs to download to the digital video recorder 14, and may remotely control any of the herein-disclosed features of the digital video recorder 14. Further, video program selection and DVR remote control may be enabled by either a wireless data access device such a wireless telephone device (e.g. a cellular telephone), a wireless computer device (e.g. a personal digital assistant), or a wireline telephony device via an interactive voice response (IVR) system.

It will be apparent to those skilled in the art that the disclosed inventions may be modified in numerous ways and may assume many embodiments other than the preferred forms specifically set out and described herein. For example, the acts described herein may be performed in an order which differs from that shown in FIGS. 2, 3 and 4. Further, some of the acts shown in FIGS. 2, 3 and 4 may be performed concurrently.

Accordingly, it is intended by the appended claims to cover all modifications which fall within the true spirit and scope of the present invention.

The invention claimed is:

1. A video playback device for use in conjunction with a wireless telephone, the video playback device comprising:
   a user interface for interaction with a user;
   a network interface for wireless communication with a video server coupled to an internet, wherein the video server stores a first plurality of video programs, and that downloads a selected one of the first plurality of video programs via the wireless communication; and
   a video player responding to the user interface for generating a video search request, and selection data for selecting the selected one of the first plurality of video programs and generates destination data that selects one of a plurality of destinations for display of the video program, wherein at least one of the plurality of destinations includes a location within the user's residence;
   wherein the video player responds to the user interface to selectively pause and stop the selected one of the first plurality of video programs and skip to a different portion of the selected one of the first plurality of video programs;
   wherein the video player is configured to display, via the user interface, a list of at least a portion of the first plurality of video programs, and the list of at least a portion of the first plurality of video programs includes at least a lower display quality and higher display quality available for at least one of the first plurality of video programs; and
   wherein the video player is configured to display, via the user interface, an indication of a plurality of previously downloaded video programs of the first plurality of video programs along with an indication that an additional episode is available for at least one of the plurality of video programs;
   wherein the video player is configured to display, via the user interface, an indication that download of the selected one of the first plurality of video programs is in progress and further to generate data to suspend the download of the selected one of the first plurality of video programs while in progress.

2. A video playback device for use in conjunction with a wireless telephone, the video playback device comprising:

a user interface;
a network interface for broadband communication with a streaming video server coupled to the internet, wherein the streaming video server stores a first plurality of video programs, and that streams a selected one of the first plurality of video programs to the video playback device via the broadband communication; and
a video player, coupled to the network interface and the user interface, that responds to interactions of the user interface via a user of the wireless telephone to generate first data sent to the streaming video server indicating the selected one of the first plurality of video programs and to display the selected one of the first plurality of video programs on a display device, the video player responding to the user interface to selectively pause and stop the selected one of the first plurality of video programs and skip to a different portion of the selected one of the first plurality of video programs;
wherein the video player is configured to display a list of at least a portion of the first plurality of video programs, and wherein the list of at least a portion of the first plurality of video programs includes at least a lower display quality and higher display quality available for at least one of the first plurality of video programs; and
wherein the video player is configured to display a viewing history that indicates a plurality of previously streamed video programs of the first plurality of video programs.

3. The video playback device of claim 2 wherein the network interface engages in broadband communication with a non-real-time video server coupled to the internet, wherein the non-real-time video server stores a second plurality of video programs, and downloads a selected one of the second plurality of video programs to the video playback device via the broadband communication; and
wherein the video player responds to interactions of the user interface via the user of the wireless telephone to generate second data sent to the non-real-time video server indicating the selected one of the second plurality of video programs and to display the selected one of the second plurality of video programs on a display device of the video playback device, the video player responding to the user interface to selectively pause and stop the selected one of the second plurality of video programs and skip to a different portion of the selected one of the second plurality of video programs.

4. The video playback device of claim 3 wherein the video player is configured to display a list of at least a portion of the second plurality of video programs, and wherein the list of at least a portion of the second plurality of video programs includes at least a lower display quality and higher display quality available for at least one of the second plurality of video programs.

5. The video playback device of claim 3 wherein the video player is configured to display a viewing history that indicates a plurality of previously watched video programs of the second plurality of video programs.

6. The video playback device of claim 3 wherein the video player is configured to select and download at least one video program of the second plurality of video programs that the user of the video playback device had previously obtained rights to display, and to display the at least one video program of the second plurality of video programs.

7. The video playback device of claim 3 wherein the video player is configured to receive, via the user interface, a search query and to send the search query to via the network interface to the non-real-time video server to search the second plurality of video programs.

8. The video playback device of claim 3 wherein the video player is configured to display an indication that download of the selected one of the second plurality of video programs is in progress.

9. The video playback device of claim 3 wherein the video player is configured to respond to user actions of the user via the user interface to stop download of the selected one of the second plurality of video programs in progress.

10. The video playback device of claim 2 wherein the video player is configured to receive, via the user interface, a search query and to send the search query to via the network interface to the streaming video server to search the first plurality of video programs.

11. A video playback device for use in conjunction with a wireless communication device, the video playback device comprising:
a user interface;
a network interface for broadband communication with a streaming video server coupled to an internet, wherein the streaming video server stores a first plurality of video programs, and that streams a selected one of the first plurality of video programs to the video playback device via the broadband communication; and
a video player, coupled to the network interface and the user interface, that responds to interactions of the user interface via a user of the wireless communication device to generate first data sent to the streaming video server indicating the selected one of the first plurality of video programs and to display the selected one of the first plurality of video programs on a display device, the video player responding to the user interface to selectively pause and stop the selected one of the first plurality of video programs and skip to a different portion of the selected one of the first plurality of video programs;
wherein the video player is configured to display a list of at least a portion of the first plurality of video programs, and wherein the list of at least a portion of the first plurality of video programs includes at least a lower display quality and higher display quality available for at least one of the first plurality of video programs; and
wherein the video player is configured to display a viewing history that indicates a plurality of previously streamed video programs of the first plurality of video programs.

12. The video playback device of claim 11 wherein the network interface engages in broadband communication with a non-real-time video server coupled to the internet, wherein the non-real-time video server stores a second plurality of video programs, and downloads a selected one of the second plurality of video programs to the video playback device via the broadband communication; and
wherein the video player responds to interactions of the user interface via the user of the wireless communication device to generate second data sent to the non-real-time video server indicating the selected one of the second plurality of video programs and to display the selected one of the second plurality of video programs on a display device of the video playback device, the video player responding to the user interface to selectively pause and stop the selected one of the second plurality of video programs and skip to a different portion of the selected one of the second plurality of video programs.

13. The video playback device of claim 12 wherein the video player is configured to display a list of at least a portion of the second plurality of video programs, and wherein the list of at least a portion of the second plurality of video programs includes at least a lower display quality and higher display quality available for at least one of the second plurality of video programs.

14. The video playback device of claim 12 wherein the video player is configured to display a viewing history that indicates a plurality of previously watched video programs of the second plurality of video programs.

15. The video playback device of claim 12 wherein the video player is configured to select and download at least one video program of the second plurality of video programs that the user of the video playback device had previously obtained rights to display, and to display the at least one video program of the second plurality of video programs.

16. The video playback device of claim 12 wherein the video player is configured to receive, via the user interface, a search query and to send the search query to via the network interface to the non-real-time video server to search the second plurality of video programs.

17. The video playback device of claim 12 wherein the video player is configured to display an indication that download of the selected one of the second plurality of video programs is in progress.

18. The video playback device of claim 12 wherein the video player is configured to respond to user actions of the user via the user interface to stop download of the selected one of the second plurality of video programs in progress.

19. The video playback device of claim 11 wherein the video player is configured to receive, via the user interface, a search query and to send the search query to via the network interface to the streaming video server to search the first plurality of video programs.

* * * * *